B. BANNISTER & J. C. PERKINS.
Hose-Couplings.
No. 146,979. Patented Feb. 3, 1874.
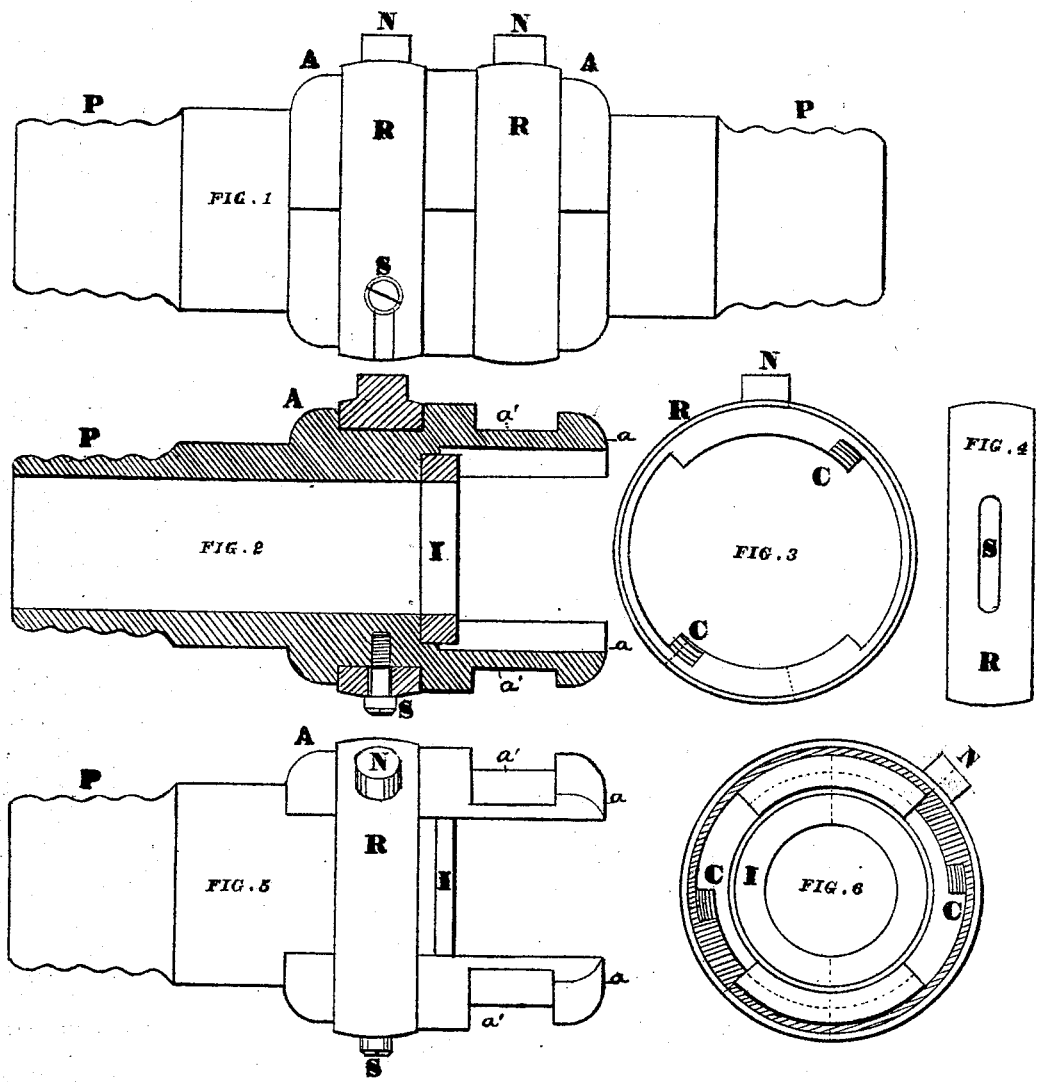
WITNESSES
INVENTORS

UNITED STATES PATENT OFFICE.

BURR BANNISTER AND JOHN C. PERKINS, OF KALAMAZOO, MICHIGAN.

IMPROVEMENT IN HOSE-COUPLINGS.

Specification forming part of Letters Patent No. 146,979, dated February 3, 1874; application filed October 14, 1873.

*To all whom it may concern:*

Be it known that we, BURR BANNISTER and JOHN C. PERKINS, of the village and county of Kalamazoo and State of Michigan, have invented certain Improvements in Hose-Coupling, of which the following is a specification:

Our invention consists of a device composed of two similar parts, and attached to the ends of the hose at the point of connection, and fitting into each other by a quick and simple operation, forming a tight and perfect coupling to pipes used for air or water, and is particularly adapted to hose used for compressed-air brakes, where, by its simple construction, and quick, easy operation, it is unequaled.

Referring to the accompanying drawing and the letters of reference marked thereon, Figure 1 is a side view of the coupling as used, A A representing its two parts in the operation. Fig. 2 shows a side section of one of its parts A. Fig. 5 is a like view of its outside. Fig. 3 is an inside view of one of the rings R. Fig. 4 is a section of the ring R, showing the slot S. Fig. 6 is an end view of one part, A, at point of connection.

We make the parts A A of our invention alike, and so that any two will fit together and form a coupling, however they may come. Each part is provided with a ring, R, encircling it, as shown in the drawings. These rings are made alike, each one being constructed with a slot, S, working over a screw or pin, as shown in the drawings. There is also a nib, N, on the rings, as shown in the drawing, for the convenience of turning them. On the inside, at opposite points of the rings, are constructed cam-projections, extending each one-fourth the distance around, as shown in the drawings at C, Fig. 3, being two on each ring, and so made that in operating they will draw at four opposite points on the parts A A. These rings R R are placed in position on the part A A, and the screw or pin put in place through the slot S. Around the center of the pipe or opening we fix rubber rings, as shown at I in the drawings, on each of the coupling parts A A, and which, when brought together and compressed by turning the rings R R, in the operation the coupling is rendered air or water tight.

Having mentioned the parts and construction of our invention, we will proceed to describe the mode of operating it.

Attaching the parts A A to the pipes at P P, the coupling is brought together, by each hand holding the parts over the rings, and passed into each other inside the rings R R. Having brought the coupling together, turn the rings around in opposite directions, when the cam-projection C on the ring of one part presses against the shoulder ends of the other part so formed, for the purpose of drawing equally at the four points above described. These cam-projections are made sufficiently wedging at the point of contact to draw the parts together, compressing the rubber I enough to render it perfectly tight, the rest of the projection being straight, and passing by far enough to hold the parts secure. In the work of coupling, the operator simply seizes the device in each hand by the rings, and puts the parts together, and gives the rings a turn in opposite directions the length of the slot. To uncouple, he simply turns the rings back to their original position.

What we claim as our invention, and desire to have patented, is—

The described coupling, consisting of the parts A A of identical construction, each being provided with the projecting segments $a$ $a$, having recesses $a'$ $a'$, slotted ring R, and securing-pin S, combined and arranged as described, for the purpose set forth.

BURR BANNISTER.
J. C. PERKINS.

Witnesses:
OSCAR T. TUTHILL,
JAMES W. HOPKINS.